US011612015B2

(12) United States Patent
Gundavelli et al.

(10) Patent No.: US 11,612,015 B2
(45) Date of Patent: *Mar. 21, 2023

(54) MACRO CELL-INFLUENCED ACCESS TO PRIVATE NETWORKS

(71) Applicant: Cisco Technology, Inc., San Jose, CA (US)

(72) Inventors: Srinath Gundavelli, San Jose, CA (US); Indermeet Singh Gandhi, Bangalore (IN); Timothy Peter Stammers, Raleigh, NC (US); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/120,891

(22) Filed: Dec. 14, 2020

(65) Prior Publication Data
US 2021/0100064 A1    Apr. 1, 2021

Related U.S. Application Data

(63) Continuation of application No. 16/540,384, filed on Aug. 14, 2019, now Pat. No. 10,912,147.

(51) Int. Cl.
*H04W 84/10*  (2009.01)
*H04W 8/20*  (2009.01)
(Continued)

(52) U.S. Cl.
CPC ........... *H04W 84/105* (2013.01); *H04W 8/20* (2013.01); *H04W 72/0453* (2013.01); *H04W 84/045* (2013.01)

(58) Field of Classification Search
CPC combination set(s) only.
See application file for complete search history.

(56) References Cited

U.S. PATENT DOCUMENTS

| 2003/0118015 A1 | 6/2003 | Gunnarsson et al. |
| 2007/0064650 A1 | 3/2007 | Lohtia et al. |

(Continued)

FOREIGN PATENT DOCUMENTS

| EP | 2782397 A1 | 9/2014 |
| WO | 2018175639 A1 | 9/2018 |

OTHER PUBLICATIONS

3GPP, "3rd Generation Partnership Project; Technical Specification Group Services and System Aspects; Security Aspects; Study on Security Aspects of PARLOS (Release 16)", 3GPP TR 33.815, V0.6.0, Release 16, (Jun. 2019), 16 pages.

(Continued)

*Primary Examiner* — Dady Chery
(74) *Attorney, Agent, or Firm* — Edell, Shapiro & Finnan, LLC

(57) ABSTRACT

A controller of a macro wireless network provisions a user device for access to local private networks based on the cell that the user device uses to attach to the macro wireless network. The controller obtains information on private networks operating within a coverage area of the macro wireless network. The controller associates a particular cell of the macro wireless network with one or more private networks operating within the particular cell. The controller (Continued)

detects a user device in the particular cell and provisions the user device with access to the one or more private networks.

20 Claims, 8 Drawing Sheets

(51) Int. Cl.
*H04W 72/0453* (2023.01)
*H04W 84/04* (2009.01)

(56) References Cited

U.S. PATENT DOCUMENTS

| | | | |
|---|---|---|---|
| 2008/0318576 A1* | 12/2008 | So | H04W 36/0066 455/434 |
| 2010/0130212 A1 | 5/2010 | So et al. | |
| 2010/0167728 A1* | 7/2010 | Venkitaraman | H04W 36/04 455/434 |
| 2010/0216426 A1 | 8/2010 | Karim et al. | |
| 2011/0222523 A1 | 9/2011 | Fu et al. | |
| 2018/0027466 A1 | 1/2018 | Trott et al. | |
| 2018/0115893 A1* | 4/2018 | Lee | H04W 60/00 |
| 2018/0139666 A1 | 5/2018 | Ahmavaara et al. | |
| 2019/0021051 A1 | 1/2019 | Joseph et al. | |
| 2019/0058999 A1* | 2/2019 | Gunasekara | H04W 16/14 |
| 2020/0092711 A1* | 3/2020 | Chen | H04W 8/205 |

OTHER PUBLICATIONS

3GPP, "3rd Generation Partnership Project; Technical Specification Group Core Network and Terminals; Access Network Discovery and Selection Function (ANDSF) Management Object (MO) (Release 15)", 3GPP TS 24.312, V15.0.0, Release 15, (Jun. 2018), pp. 1-150.

3GPP, "3rd Generation Partnership Project; Technical Specification Group Core Network and Terminals; Access Network Discovery and Selection Function (ANDSF) Management Object (MO) (Release 15)", 3GPP TS 24.312, V15.0.0, Release 15, (Jun. 2018), pp. 151-300.

3GPP, "3rd Generation Partnership Project; Technical Specification Group Core Network and Terminals; Access Network Discovery and Selection Function (ANDSF) Management Object (MO) (Release 15)", 3GPP TS 24.312, V15.0.0, Release 15, (Jun. 2018), pp. 301-394.

International Search Report and Written Opinion in counterpart International Application No. PCT/US2020/045092, dated Oct. 13, 2020, 14 pages.

AT&T Intellectual Property, "AT&T Expands Wi-Fi Roaming Agreement with Boingo", https://about.att.com/story/2019/boingo_wifi_expansion.html, Feb. 20, 2019, 3 pages.

* cited by examiner

| | TRACKING AREA CODE (TAC) | E-UTRAN CELL IDENTIFIER (ECI) | CBRS-NID | CBRS NAME | RANK |
|---|---|---|---|---|---|
| | 220 | 225 | 230 | 235 | 240 |
| 250 | 2345 | 0xffbcdaa | 0x0011231 | UNIVERSITY | 2 |
| 252 | 2345 | 0xffbcdaa | 0x0011232 | RESTAURANT | 4 |
| 254 | 2345 | 0xffbcdbb | 0x0224561 | MEETING VENUE | 1 |
| 256 | 2345 | 0xffbsdbb | 0x0034987 | HOTEL | 3 |
| 258 | 2345 | 0xffbcdcc | 0x0034987 | HOTEL | 3 |

MACRO CELL-INFLUENCED ACCESS TO PRIVATE NETWORKS

CROSS-REFERENCE TO RELATED APPLICATIONS

This application in a continuation of U.S. application Ser. No. 16/540,384, filed Aug. 14, 2019, the entire contents of which are incorporated herein by reference.

TECHNICAL FIELD

The present disclosure relates to offloading network traffic from licensed macro networks to private networks.

BACKGROUND

Mobile operators are exploring new ways to offload traffic from their licensed macro cell network to unlicensed access. Initially, macro network operators gained additional bandwidth from access to unlicensed IEEE 802.11 (i.e., Wi-Fi) networks, but private Long Term Evolution (LTE) networks operating in the Citizens Broadband Radio Service (CBRS) band may provide better options for offloading traffic. Private LTE networks in shared and unlicensed spectrum allow organizations an opportunity to own and operate their own secure, quality controlled, wireless network without relying on a cellular carrier, and without the inherent compromises of Wi-Fi or other unlicensed operating bands offering inconsistent service levels (e.g., due to interference and/or congestion).

BRIEF DESCRIPTION OF THE DRAWINGS

FIG. 2B illustrates a database associating macro network cells with private networks operating within the macro wireless network, according to an example embodiment.

DESCRIPTION OF EXAMPLE EMBODIMENTS

Overview

Figure 1:
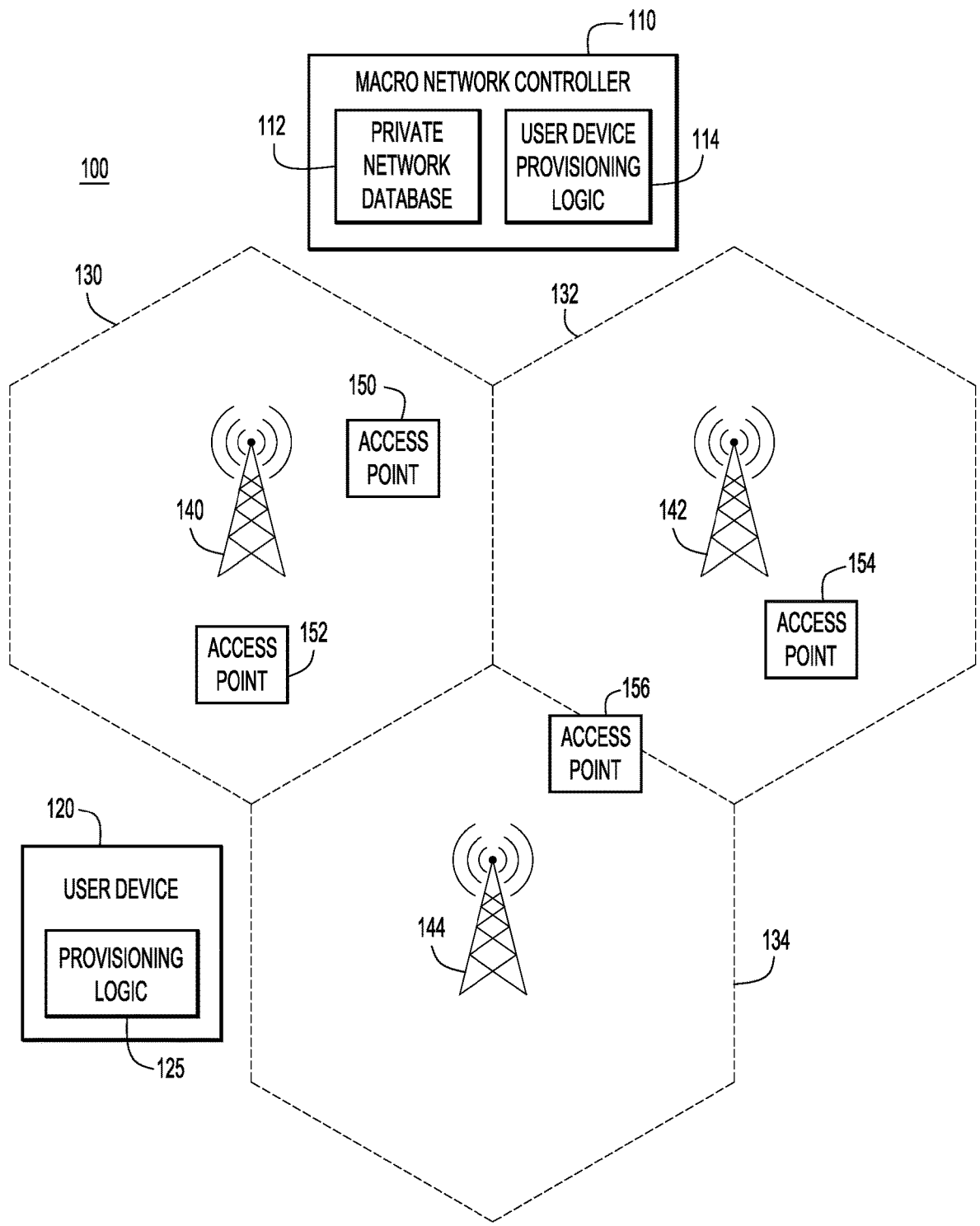
FIG. 1 is a simplified block diagram of a provisioning system configured to provide user devices access to private networks based on access to a macro wireless network, according to an example embodiment.

A method is provided for a controller of a macro wireless network to provision a user device for access to local private networks. The method includes the controller obtaining information on private networks operating within a coverage area of the macro wireless network. The method also includes associating a particular cell of the macro wireless network with one or more private networks operating within the particular cell. The method further includes detecting a user device in the particular cell and provisioning the user device with access to the one or more private networks.

EXAMPLE EMBODIMENTS

With the clearance of spectrum rules for the CBRS band, public and private entities have shown interest in building open access networks in the CBRS band. The organizations have the opportunity to own and operate their own secure, quality controlled, wireless network without relying on a cellular carrier or the inherent compromises of Wi-Fi or other unlicensed bands offering inconsistent service levels due to interference or congestion. Many of these network will be open access network with no explicit monetary service cost. For instance, theme parks, universities, conference centers, exhibition/trade venues, and hospitality chains may deploy their own private LTE services and benefit from the simplicity and ability to control the security reliability, and Quality of Service (QoS) of the network. Additionally, these organizations may also offer internet services to their guests over their own private LTE CBRS network.

Mobile network operators may have an interest in moving non-essential traffic to these open access networks, without forcing their users to confront the difficulties of remote Subscriber Identity Module (SIM) provisioning, SIM swapping, network discovery, or selecting free networks. Currently, the CBRS specification assumes a preconfigured profile, based on either the operator's hardware SIM, or a dynamically created profile (e.g., using an Embedded Universal Integrated Circuit Card (eUICC) provisioning interface), which presents challenges for network discovery and onboarding.

Private LTE networks enable network managers to optimize performance to get predictable latency and improved QoS, supporting efficiencies in many aspects of the network. Additionally, operating a private network provides an organization visibility into the applications running on the mobile devices of the users. Large venue owners (e.g., universities, theme parks, exhibition centers, hospitality chains, sports venues, etc.) may own and deploy their own virtual Evolved Packet Core (vEPC) network with CBRS Service Devices (CBSDs) as access points. These large venues may provide services to the staff through a private LTE CBRS network, as well as striving to provide guest users internet services.

In one example, a macro wireless network may push CBRS-NIDs of available private networks to user devices as the user devices move through the cells of the macro wireless network. Initially, the macro network operator builds a private database of CBRS networks that allow open internet access, and associates each CBRS network with a macro RAN cell identifier. As the user device moves across the cells of the macro network, the macro network operator adds CBRS-NIDs that are available in the current cell, and deletes CBRS-NIDs that are no longer available in the current cell. The macro network operator also pushes rules and rankings of the CBRS networks to enable the user device to select the most appropriate CBRS network. The user device selects a CBRS network and gains internet access via the selected CBRS network.

Referring now to FIG. 1, a provisioning system 100 to enable an operator of a macro wireless network to provision user devices with access to available private networks. The macro wireless network includes a controller 110 configured to control transmitters in a plurality of cells of the macro network. The controller 110 includes a private network database 112 that associates private networks that may be available within the coverage of the macro network, and user device provisioning logic 114 configured to provision a user device 120 to access the private networks. The user device 120 includes provisioning logic 125 configured to receive instructions from the controller 110 and allow the user device 120 to access the private networks.

The macro wireless network includes cells 130, 132, and 134 that are served by wireless transceivers 140, 142, and 144, respectively. In one example, the wireless transceivers 140, 142, and 144 may be cellular transmission towers operated by a Mobile Network Operator (MNO). Within the coverage area of the macro wireless network (i.e., within cells 130, 132, and/or 134), private networks may operate access points 150, 152, 154, and/or 156. In one example, the private networks may be a private LTE network on a CBRS band.

In one example, a theme park may operate a private CBRS network to provide a reliable, high QoS, and secure LTE network for the mobile devices of the theme park's employees, as well as the Information Technology (IT), Operational Technology (OT), and Internet of Things (IoT) devices in the theme park. Additionally, the theme park operator may provide guest users access to internet services when on the premises, without forcing the guests to use another Universal SIM (USIM). By providing such services, the theme park operator may get closer to its customers and guests through in-venue engagements, and subsequently, targeted marketing and advertisement.

In another example, venue operators deploy a private CBRS Network Identifier (NID) to operate the network as a private LTE network in 3GPP access mode, in contrast to a Neutral Host Network (NHN) deployment use case, which may require the contractual participation of multiple service providers. In the private deployment, the network may also permit access to guest users with mobile devices that do not have an International Mobile Subscriber Identity (IMSI) or USIM that belongs to the venue operator. The kind of services offered through open access for off-network IMSIs may be provided on a best effort basis, or may only provide access to specific services/web sites/applications.

Figure 2A:
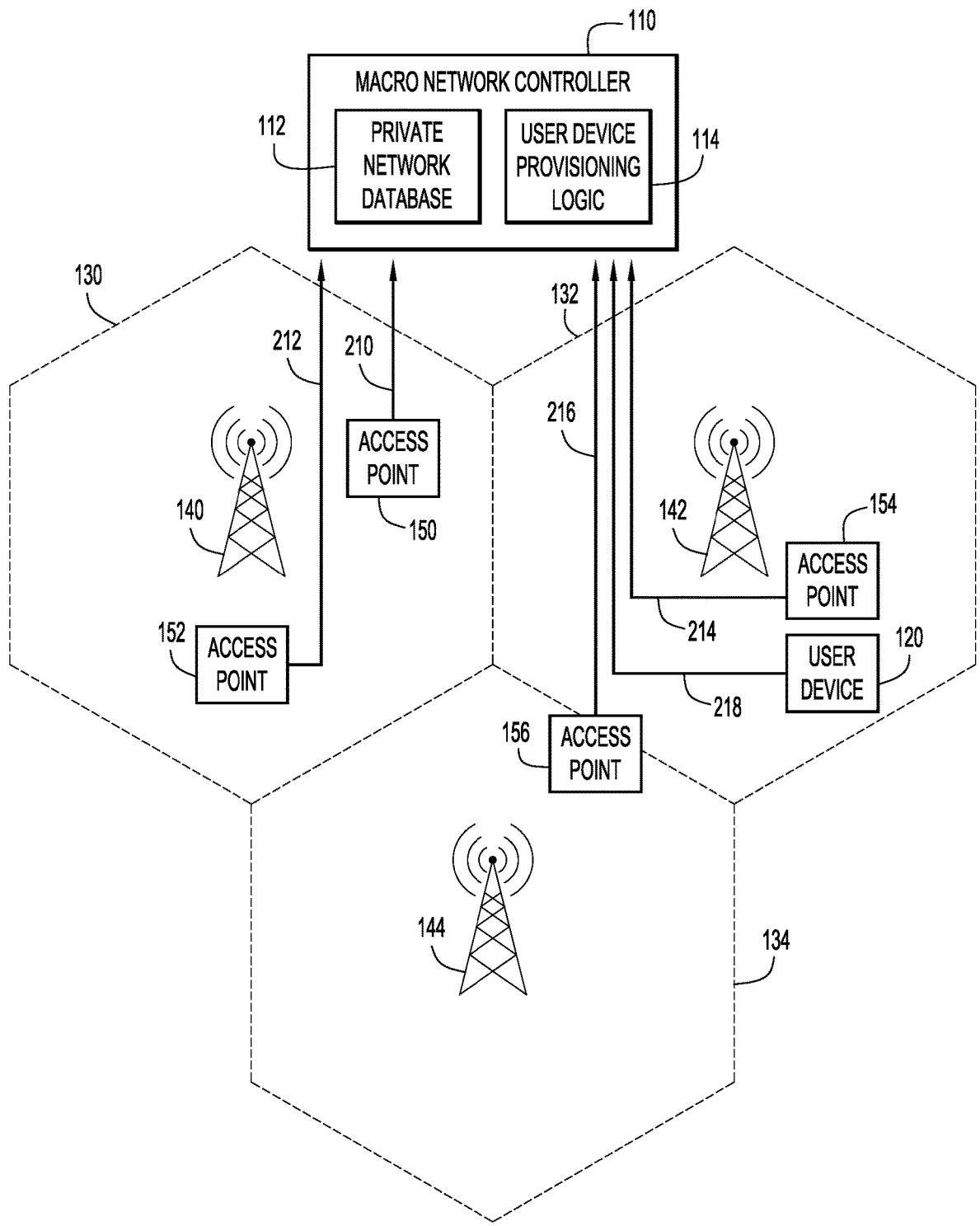
FIG. 2A is a message flow diagram illustrating a macro wireless network controller gathering information about private networks in the coverage area of the macro wireless network, according to an example embodiment.

Referring now to FIG. 2A, a message flow diagram illustrates the controller 110 gathering information about private networks operating in the macro wireless network. For each of the private networks that are served by access points 150, 152, 154, and/or 156, the controller 110 gathers information 210, 212, 214, and 216, respectively. In one example, the information 210, 212, 214, and 216 may be gathered out of band from the operator(s) of the private networks. The user device 120 may also provide information 218 about any private networks that the user device 120 detects. The information about the private networks may include an identifier for the private network (e.g., a CBRS-NID), and enabled the controller 110 to populate the private network database 112 with private network identifiers in association with cell identifiers.

Referring now to FIG. 2B, an example of entries in the private network database 112 is shown. Each entry/row in this example of the private network database 112 include information about a particular cell in the macro network, such as a Tracking Area Code (TAC) in column 220 and an Evolved UMTS (Universal Mobile Telecommunications Service) Terrestrial Radio Access Network (E-UTRAN) Cell Identifier (ECI) in column 225. Each entry/row also includes information on a private network that is operating within the coverage area of the cell identified With the TAC 220 and ECI 225, such as a CBRS-NID in column 230 and a CBRS name in column 235. Additionally, the macro network operator may rank the private networks based on a performance metric, which may include, for example, reliability, QoS, security, and/or business relationships.

Each entry/row corresponds to a particular access point providing a private network. Entry 250 associates the cell (e.g., cell 130) with a TAC value of 2345 and an ECI value of 0xffbcdaa with the private network (e.g., provided by access point 150) with a CBRS-NID of 0x0011231 and a CBRS name of University. Entry 252 associates the cell (e.g., cell 130) with a TAC value of 2345 and an ECI value of 0xffbcdaa with the private network (e.g., provided by access point 152) with a CBRS-NID of 0x0011232 and a CBRS name of Restaurant. Entry 254 associates the cell (e.g., cell 132) with a TAC value of 2345 and an ECI value of 0xffbcdbb with the private network (e.g., provided by access point 154) with a CBRS-NID of 0x0224561 and a CBRS name of Meeting Venue. Entry 256 associates the cell (e.g., cell 132) with a TAC value of 2345 and an ECI value of 0xffbcdbb with the private network (e.g., provided by access point 156) with a CBRS-NID of 0x0034987 and a CBRS name of Hotel. Entry 258 associates the cell (e.g., cell 134) with a TAC value of 2345 and an ECI value of 0xffbcdcc with the private network (e.g., provided by access point 156) with a CBRS-NID of 0x0034987 and a CBRS name of Hotel.

In one example, a Mobile Network Operator (MNO) that runs a macro network, (e.g., a cellular network provider) may learn the private CBRS-NIDs out of band, and build a private database 112 of the CBRS-NIDs. The database 112 of the MNO may comprise entries which define neighbor relationships between private CBRS-NIDs and MNO network RAN identifiers, as described in FIG. 2B. For each RAN identifier (e.g., TAC and E-UTRAN Cell Identifier), the database associates one or more private network CBRS-NIDs (i.e., unique identity of the CBRS network), which is broadcast by the network of the private organization.

Figure 3A:
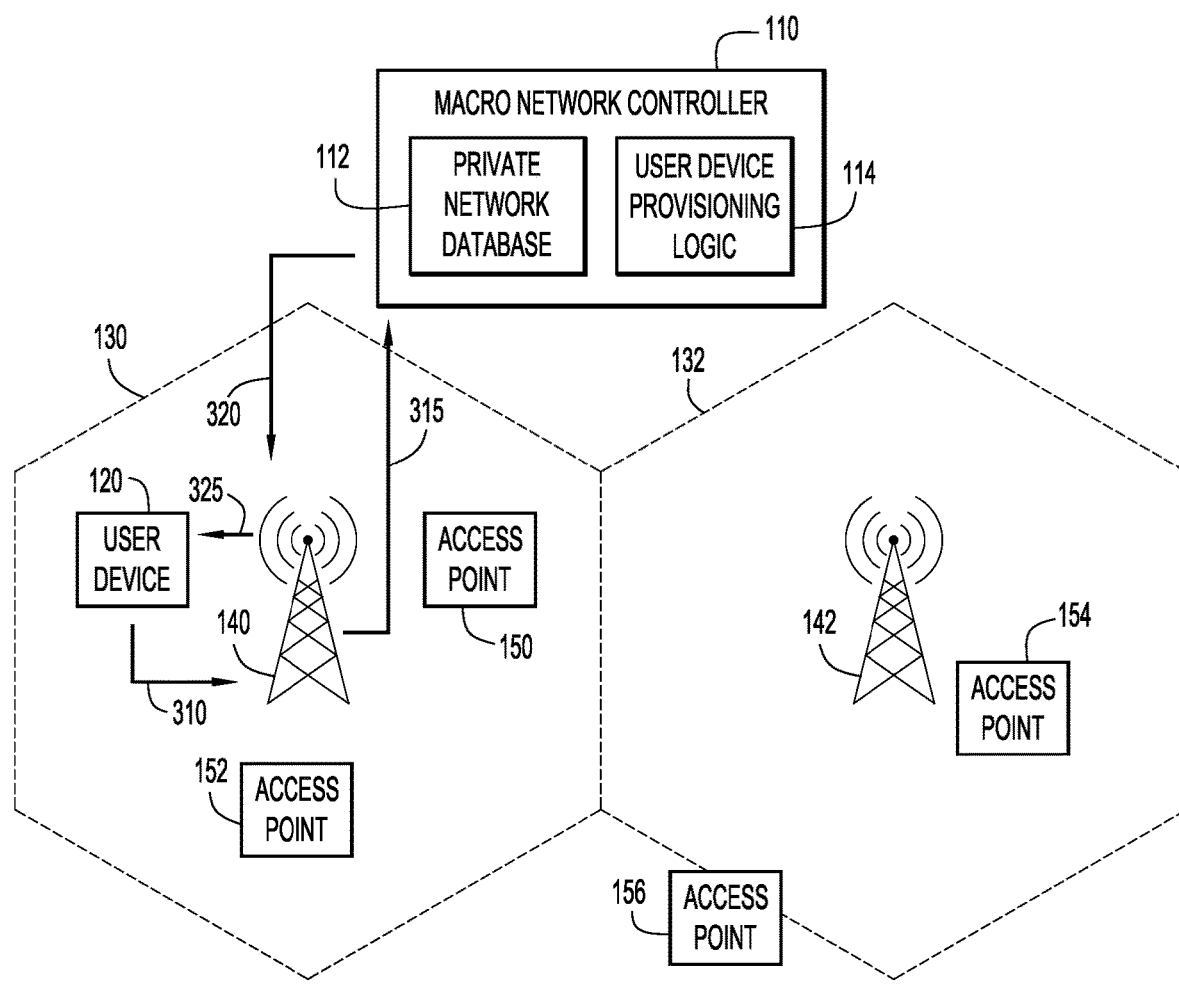
FIG. 3A is a message flow diagram illustrating a user device being provided access to local private networks via the macro wireless network, according to an example embodiment.

Referring now to FIG. 3A, a message flow diagram illustrates the macro network controller 110 provisioning a user device to access local private networks. When the user device 120 enters the cell 130 of the macro wireless network, the user device 120 sends a registration 310 to the wireless transceiver 140 to gain access to the macro wireless network. The wireless transceiver 140 notifies the controller 110 with a message 315 indicating that the user device 120 is attached to the wireless transceiver 140 in cell 130. The controller 110 determines that access points 150 and 152 each provide private networks to which the user device 120 may attach, and the controller 110 sends a message 320 to the wireless transceiver 140 with information for attaching to the private networks via access points 150 and/or 152. The wireless transceiver 140 sends a message 325 to the user device 120, provisioning the user device 120 to access private networks through access points 150 and/or 152.

In one example, the information provided to the user device 120 includes an identifier (e.g., a CBRS-NID) for the private networks offered by access points 150 and/or 152. The message 325 may automatically install credentials to access the private networks without user intervention or knowledge. The information in message 325 may enable the user device 120 to attach to the access points 150 and/or 152 without previous interaction with the access points 150 and/or 152. By storing the information on private networks that are available in each cell of the macro wireless network, the controller 110 removes any need for the user device 120 to perform an explicit network discovery process, and the user device 120 may simply attach to the private network.

In another example, having built the database of available private CBRS-NIDs and mapped it across the TAC and e-UTRAN Cell Identifier, the MNO controller 110 may offload network traffic to the private networks, depending on system policies (e.g., coverage gaps or preferences for offloading traffic from licensed spectrum). The MNO may push the available CBRS-NIDs of private networks to the mobile devices (e.g., to the USIM) over the air (e.g., leveraging Open Mobile Alliance (OMA) protocols) along with a tag identifying the private networks as "free" or "open." As the user device moves across cells, the MNO may add or delete the CBRS-NIDs by using the knowledge of which CBRS networks are in proximity to macro network cells. The MNO may also maintain a rank of CBRS networks based on historical data network performance, if there are multiple private networks available in a cell.

An initial or bootstrap profile may only allow user devices to access CBRS network belonging to the MNO. With new updates, as described herein, the updates pushed by the MNO directly to the USIM enable the mobile device to send LTE attach requests to private venue RAN networks. Typically, these private CBRS-NIDs will provide internet access to the users' mobile devices free of change. Additionally, the MNO may also provide policies and rules on when the mobile devices connect to the open access CBRS networks.

Figure 3B:
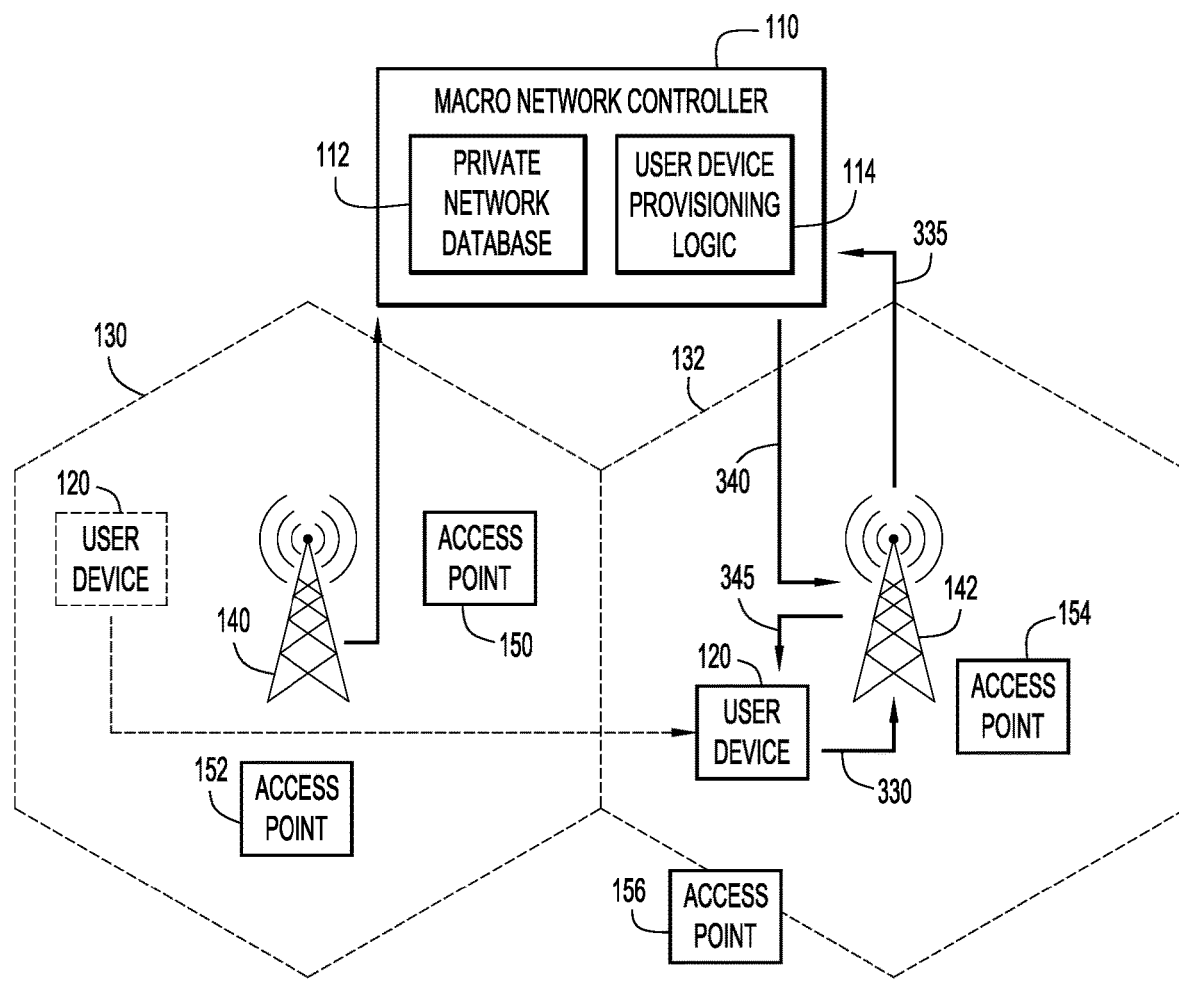
FIG. 3B is a message flow diagram illustrating a macro wireless network controller updating the access to private networks available to a user device when the user device moves to a different cell in the macro network, according to an example embodiment.

Referring now to FIG. 3B, a message flow diagram illustrates the macro network controller 110 re-provisioning the user device 120 when the user device moves between cells of the macro wireless network. When the user device 120 moves from the cell 130 to the adjacent cell 132 of the macro wireless network, the user device 120 sends a registration 330 to the wireless transceiver 142 to transfer its attachment to the macro wireless network from the wireless transceiver 140 to the wireless transceiver 142. The wireless transceiver 142 notifies the controller 110 with a message 335 indicating that the user device 120 is now attached to the wireless transceiver 142 in cell 132. The controller 110 determines that access points 154 and 156 each provide private networks to which the user device 120 may attach, and the controller 110 sends a message 340 to the wireless transceiver 140 with information for attaching to the private networks via access points 154 and/or 156.

The wireless transceiver 142 sends a message 345 to the user device 120, provisioning the user device 120 to access private networks through access points 154 and/or 156. Additionally, the message 345 may remove the previously provisioned access to the access points 150 and 152, since the access points 150 and 152 are not operating in the adjacent cell 132. Alternatively, the message 345 may leave the credentials for attaching to access points 150 and/or 152, but lower the ranking of the private networks available through access points 150 and/or 152, since the access points 150 and 152 may provide a degraded service in the cell 132.

Figure 4:
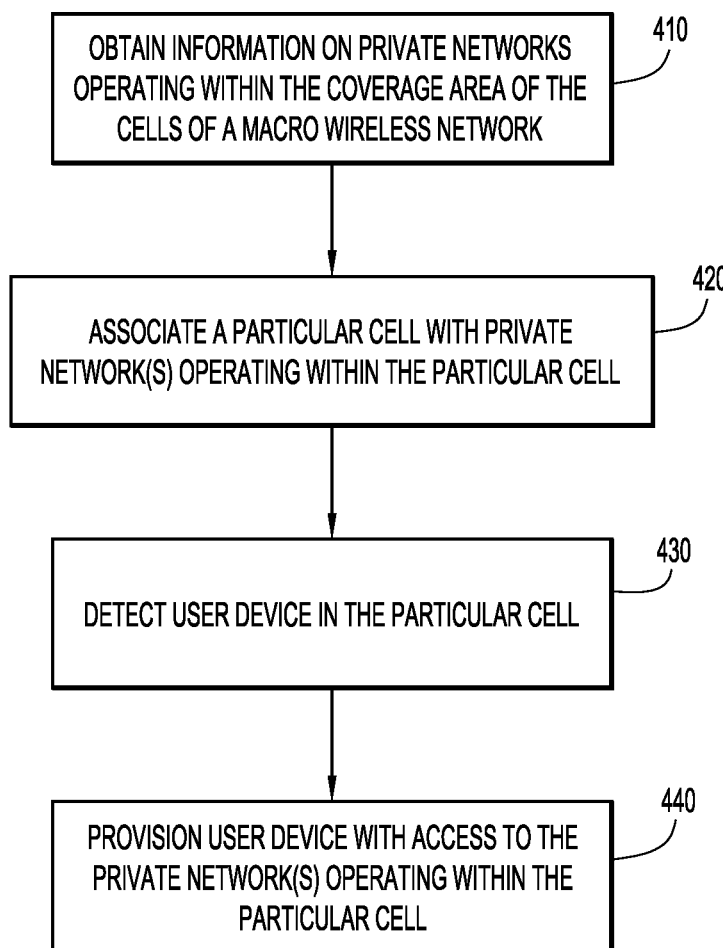
FIG. 4 is a flowchart illustrating operations of a macro wireless network controller in providing a user device access to local private networks, according to an example embodiment.

Referring now to FIG. 4, a flowchart illustrating operations performed at a macro wireless network controller (e.g., controller 110) in a process 400 for provisioning a user device with access to local private networks. At 410, the controller obtains information on private networks operating within the coverage area of the cells of a macro wireless network. In one example, the information on the private networks may be provided out of band by the operators of the private networks. Alternatively, the operator of the macro wireless network may proactively determine which private networks are operating, and store information on the available private networks. At 420, the controller associates a particular cell with one or more private networks operating within the particular cell. In one example, the controller may maintain a database correlating RAN identifiers (e.g., TAC and ECI) of the particular cell with identifiers of the private networks (e.g., CBRS-NID and CBRS name). Additionally, the controller may determine a ranking of the private networks based on a metric of performance for the macro wireless network operator and/or the user device.

At 430, the controller detects that a user device is in the particular cell. In one example, the wireless transceiver for the particular cell detects that the user device attaches to the macro network, and notifies the controller of the macro wireless network. At 440, the controller provisions the user device with access to the one or more private networks operating within the particular cell of the macro wireless network. In one example, the controller provisions the user device with access to the private networks by causing the wireless transceiver for the particular cell to install information about the private networks (e.g., a CBRS-NID) on the user device.

Figure 5:
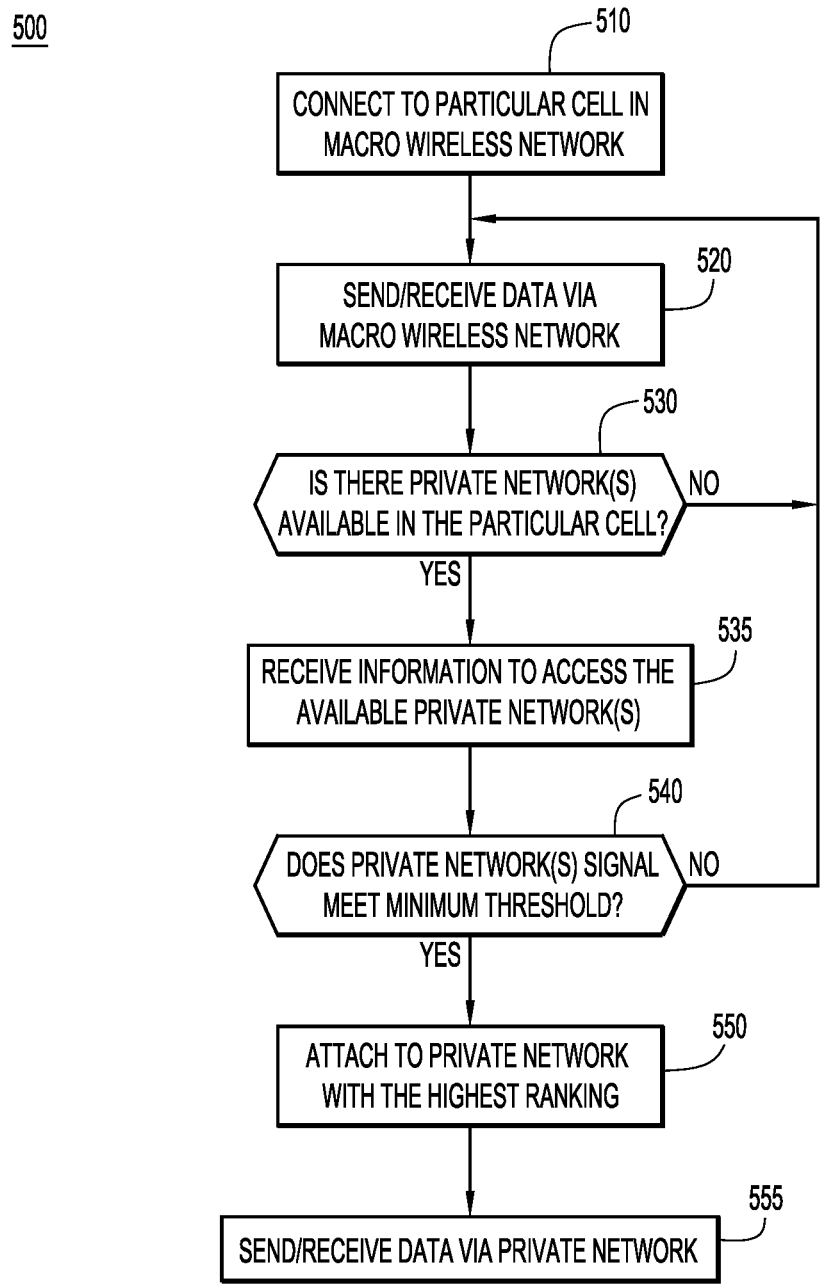
FIG. 5 is a flowchart illustrating operations of a user device to access local private networks, according to an example embodiment.

Referring now to FIG. 5, a flowchart illustrates operations performed at a user device (e.g., user device 120) in a process 500 to be provisioned to access local private networks. At 510, the user device connects to a particular cell in a macro wireless network and beings to send and receive data via the macro wireless network at 520. In one example, the macro wireless network may be a cellular telephone/data network. At 530, the user device determine if it is configured for access to private networks. In one example, the user device may determine that it is not configured for access to private networks if no information about private networks has been provisioned to the user device. If there are no private networks available in the particular cell of the macro wireless network, then the user device returns to sending and receiving data via the macro wireless network at 520.

If there are private networks available in the particular cell, then the user device receives information to access the available private networks at 535. In one example, the information includes an identifier (e.g., a CBRS-NID) for private networks that are available in the particular cell of the macro wireless network. The information may be automatically provided to the user device by the macro wireless network, without explicit direction from the user, enabling the user device to access the private network (e.g., to offload data form the macro wireless network) without notifying the user.

At 540, the user device determines whether the signal from the private network that was provisioned at 535 meets a predetermined threshold. In one example, the predetermined threshold may include signal strength, security protocol, QoS, bandwidth, and/or available services. Additionally, the predetermined threshold may include a ranking of multiple private networks available to the user device, and the user device may select a particular private network based on the ranking.

If the private network does not meet the predetermined threshold, then the user device returns to sending and receiving data over the macro wireless network at 520. If the private network does meet the predetermined threshold, then the user device attaches to the private network at 550. The user device may then send and receive data via the private network. In one example, the user device may send and receive data via the macro wireless network and the private network.

In one specific implementation, a user device obtains NIDs of CBRS networks from the MNO based on the cell of the MNO network. For a user device (e.g., user device 120) that is connected to the MNO macro network, the MNO network determines whether there is an open CBRS network in the vicinity (e.g., cell or TAC) of the user device. If there are no available CBRS networks, the MNO directs the user device to stay connected to the MNO network. If there are available CBRS networks, the MNO network adds the available CBRS-NIDs to the user device, and deletes any CBRS-NIDs that were previously provided for a different cell. As the user device moves between cells, the MNO network may update the available CBRS-NIDs.

If the user device determines that the CBRS signal does not meet a predetermined minimum threshold, then the user device remains connected to the MNO network. If the user device determines that there is at least one CBRS signal that meets the predetermined threshold, then the user device may compare the CBRS networks to determine which CBRS network to join. For instance, the MNO may provide a ranked list of CBRS networks based on historical performance or other criteria. Alternatively, the user device may rank the CBRS networks based on local data, such as signal strength or user preference. Once the user device determines which CBRS network is preferred, the user device may attach to the private CBRS network as a secondary Packet Data Network (PDN) for internet services.

In another example, the MNO may choose to use the private CBRS network as the secondary link for its subscribers to connect. In this example, the user device maintains a primary PDN/PDU connection through the MNO network and a secondary PDN/PDU connection though the local private CBRS network, offloading bandwidth for certain applications.

In a further example, an MNO subscriber may use a non-Evolved Packet System (EPS) Authentication and Key Agreement (AKA) method prescribed by the CBRS alliance to authenticate the local private CBRS network. Alternatively, the private network may allow the subscriber to skip the authentication procedure for off-network user devices, but still collect the device identifiers through 3GPP NAS Identity procedures.

Venue Owners may now allow internet access to guest user devices and apply visitor policies to the network access (e.g., best effort service, access restriction, duration of access). Granular policies and access grant/reject policies may be applied by a private network operator if the private network operator prefers to have a business relationship with certain macro network operators to provide access to their users free of cost, or to provide offloading services to a particular MNO.

Figure 6:
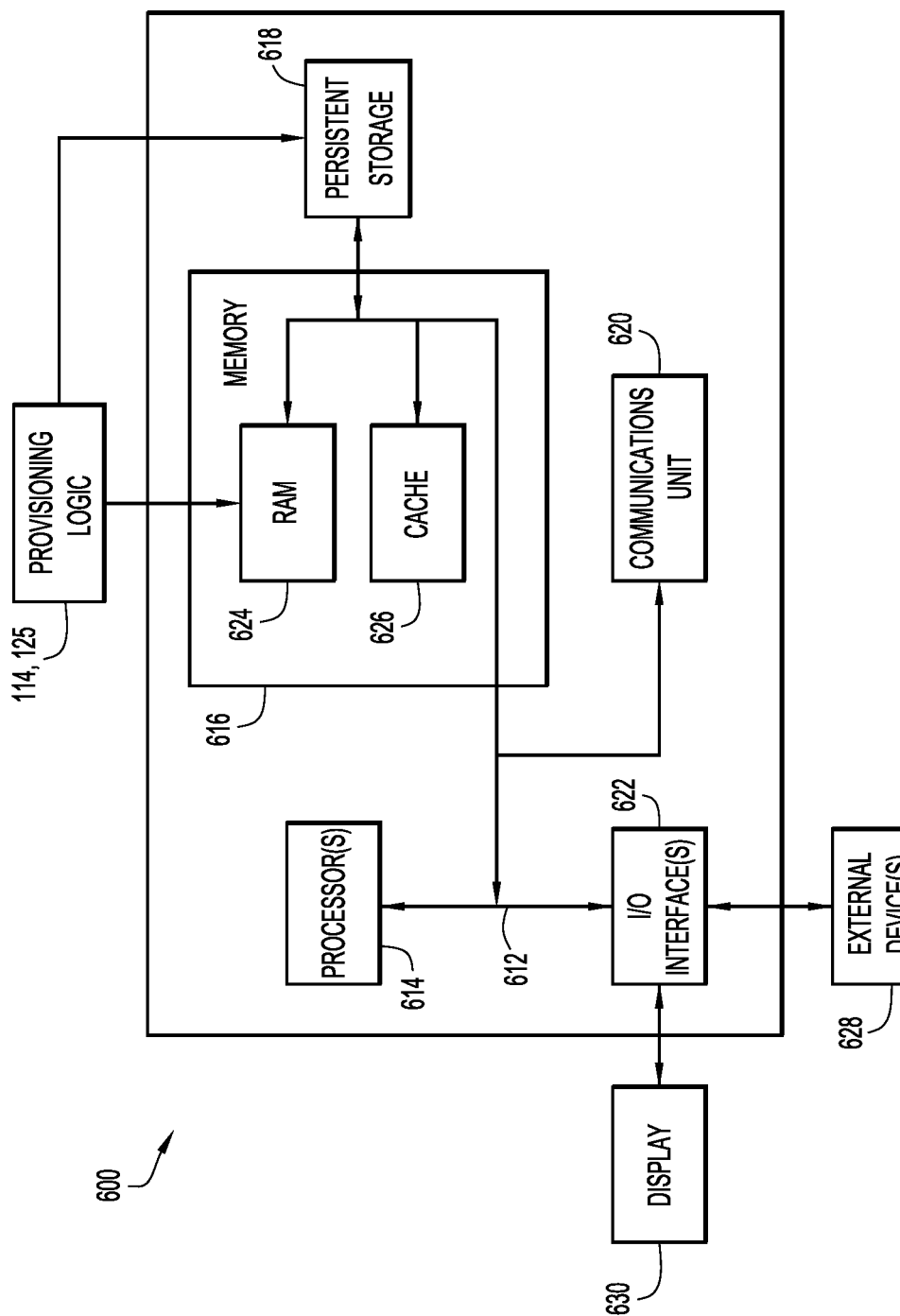
FIG. 6 illustrates a simplified block diagram of a device that may be configured to perform methods presented herein, according to an example embodiment.

Referring now to FIG. 6, a hardware block diagram illustrates a computing device 600 that may perform the functions of any of the servers or computing or control entities referred to herein in connection with the provisioning system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the provisioning logic 114 or 125 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface units, such as network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein provide for private LTE networks that allow user devices, both MNO-network devices and non-MNO-network devices, to attach to CBRS networks that are open. The MNO learns the private network identifiers (e.g., CBRS-NIDs) and maintains a database associating the private networks with macro network RAN identifiers (e.g., TAC, E-UTRAN cell identifiers). The MNO pushes the private network identifiers directly into the mobile device along with a "free/open" tag that indicates internet access capability of the private network. The MNO has the capability to add or delete private network identifiers on demand as the user devices move, without external location systems (e.g., Global Positioning Systems).

Optionally, the MNO may push rules and policies for when the private networks may be used, or provide data for selecting the best private network when multiple private networks are available in the same MNO network cell. The user devices use the private networks as a secondary PDN/PDU (e.g., an untrusted network). The private LTE networks allow access to visitor devices (e.g., non-MNO-network IMSI) and apply visitor policies during access.

In one form, a method is provided for a controller of a macro wireless network to provision a user device for access to local private networks. The method includes the controller obtaining information on private networks operating within a coverage area of the macro wireless network. The method also includes associating a particular cell of the macro wireless network with one or more private networks operating within the particular cell. The method further includes detecting a user device in the particular cell and provisioning the user device with access to the one or more private networks.

In another form, an apparatus comprising a network interface and a processor is provided. The network interface is configured to communicate with a plurality of computing devices across one or more computer networks. Each of the computing devices is associated with a cell in a macro wireless network. The processor is configured to obtain information on private networks operating within a coverage area of the macro wireless network. The processor is also configured to associate a particular cell of the macro wireless network with one or more private networks operating within the particular cell. The processor is further configured to detect a user device in the particular cell, and cause the particular cell to provision the user device with access to the one or more private networks.

In yet another form a non-transitory computer readable storage media is provided that is encoded with instructions that, when executed by a processor of a macro wireless network controller, cause the processor to obtain information on private networks operating within a coverage area of the macro wireless network. The instructions also cause the processor to associate a particular cell of the macro wireless network with one or more private networks operating within the particular cell. The instructions further cause the processor to detect a user device in the particular cell, and cause the particular cell to provision the user device with access to the one or more private networks.

In still another form, a system comprising a plurality of wireless transceivers in a macro wireless network and a controller of the macro wireless network. Each of the wireless transceivers is associated with a cell in the macro wireless network. The controller is configured to obtain information on private networks operating within a coverage area of the macro wireless network. The controller is also configured to associate a particular cell of the macro wireless network with one or more private networks operating within the particular cell. The controller is further configured to detect a user device in the particular cell and cause the particular cell to provision the user device with access to the one or more private networks.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a user device, connecting to a particular cell in a macro wireless network, the macro wireless network comprising a plurality of geographically spaced cells;
   obtaining from the particular cell in the macro wireless network, one or more credentials corresponding to one or more private networks operating within a coverage area of the particular cell of the macro wireless network, the one or more private networks operated separately from the macro wireless network;
   selecting a local private network among the one or more private networks; and
   connecting to the local private network using a corresponding credential obtained from the macro wireless network.

2. The method of claim 1, wherein obtaining the one or more credentials comprises a macro wireless network controller remotely programming a Subscriber Identity Module (SIM) on the user device with one or more credentials to access the one or more private networks.

3. The method of claim 1, further comprising:
   moving the user device from the particular cell to an adjacent cell in the macro wireless network; and
   obtaining from the macro wireless network, one or more additional credentials to access at least one other private network operating within the adjacent cell.

4. The method of claim 3, further comprising removing access from the user device to any of the one or more private networks operating within the particular cell that are not also operating within the adjacent cell.

5. The method of claim 1, further comprising obtaining a ranked list from the macro wireless network, the ranked list ranking the one or more private networks according to at least one predetermined criterion.

6. The method of claim 5, wherein selecting the local private network among the one or more private networks is based on the ranked list.

7. The method of claim 1, further comprising offloading data from the macro wireless network to one of the one or more private networks.

8. An apparatus comprising:
   a wireless network interface configured to communicate with one or more wireless networks including a macro wireless network comprising a plurality of geographically spaced cells; and
   a processor coupled to the wireless network interface, the processor configured to:
   cause the wireless network interface to connect to a particular cell in the macro wireless network;
   obtain from the particular cell in the macro wireless network via the wireless network interface, one or more credentials corresponding to one or more private networks operating within a coverage area of the particular cell of the macro wireless network, the one or more private networks operated separately from the macro wireless network;
   select a local private network among the one or more private networks; and
   cause the wireless network interface to connect to the local private network using a corresponding credential obtained from the macro wireless network.

9. The apparatus of claim 8, further comprising a Subscriber Identity Module (SIM), wherein the processor is configured to obtain the one or more credentials by a macro wireless network controller remotely programming the SIM with one or more credentials to access the one or more private networks.

10. The apparatus of claim 8, wherein the processor is further configured to:
    detect that the apparatus has moved from the particular cell to an adjacent cell in the macro wireless network; and
    obtain from the macro wireless network via the wireless network interface, one or more additional credentials to access at least one other private network operating within the adjacent cell.

11. The apparatus of claim 10, wherein the processor is further configured to remove access from the apparatus to any of the one or more private networks operating within the particular cell that are not also operating within the adjacent cell.

12. The apparatus of claim 8, wherein the processor is further configured to obtain a ranked list from the macro wireless network via the wireless network interface, the ranked list ranking the one or more private networks according to at least one predetermined criterion.

13. The apparatus of claim 12, wherein the processor is configured to select the local private network among the one or more private networks based on the ranked list.

14. The apparatus of claim 8, wherein the processor is further configured to offload data from the macro wireless network to one of the one or more private networks.

15. One or more non-transitory computer readable storage media encoded with software comprising computer executable instructions and, when the software is executed on a processor of a user device, operable to cause a processor to:
- connect to a particular cell in a macro wireless network, the macro wireless network comprising a plurality of geographically spaced cells;
- obtain from the particular cell in the macro wireless network, one or more credentials corresponding to one or more private networks operating within a coverage area of the particular cell of the macro wireless network, the one or more private networks operated separately from the macro wireless network;
- select a local private network among the one or more private networks; and
- connect to the local private network using a corresponding credential obtained from the macro wireless network.

16. The one or more non-transitory computer readable storage media of claim 15, wherein the software is further operable to cause the processor to obtain the one or more credentials by a macro wireless network controller remotely programming a Subscriber Identity Module (SIM) on the user device with one or more credentials to access the one or more private networks.

17. The one or more non-transitory computer readable storage media of claim 15, wherein the software is further operable to cause the processor to:
- detect that the user device has moved from the particular cell to an adjacent cell in the macro wireless network; and
- obtain from the macro wireless network, one or more additional credentials to access at least one other private network operating within the adjacent cell.

18. The one or more non-transitory computer readable storage media of claim 17, wherein the software is further operable to cause the processor to remove access from the user device to any of the one or more private networks operating within the particular cell that are not also operating within the adjacent cell.

19. The one or more non-transitory computer readable storage media of claim 15, wherein the software is further operable to cause the processor to obtain a ranked list from the macro wireless network, the ranked list ranking the one or more private networks according to at least one predetermined criterion.

20. The one or more non-transitory computer readable storage media of claim 19, wherein the software is further operable to cause the processor to select the local private network among the one or more private networks based on the ranked list.

* * * * *